(No Model.)

J. DARLING.
CHECK HOOK FOR HARNESS.

No. 310,034. Patented Dec. 30, 1884.

WITNESSES:
John H. Deemer
C. Sedgwick

INVENTOR:
J. Darling
BY
Munn
ATTORNEYS.

UNITED STATES PATENT OFFICE.

JOSEPH DARLING, OF KARNS CITY, PENNSYLVANIA.

CHECK-HOOK FOR HARNESS.

SPECIFICATION forming part of Letters Patent No. 310,034, dated December 30, 1884.

Application filed September 3, 1884. (No model.)

*To all whom it may concern:*

Be it known that I, JOSEPH DARLING, of Karns City, in the county of Butler and State of Pennsylvania, have invented a new and Improved Check-Hook for Harness, of which the following is a full, clear, and exact description.

The object of this invention is to provide such arrangement of the check-hook of harness that the driver may uncheck the horse and check him up again without leaving the carriage or other vehicle; and the invention consists, principally, of a check-hook adapted to slide through the saddle-tree or back-pad of the harness, and having a strap or cord attached to it for operating the hook to uncheck or check up the horse.

The invention also consists of suitable means for locking the hook in and unlocking it from the saddle-tree or pad, and also of the construction, arrangement, and combination of parts, all as hereinafter described and claimed.

Reference is to be had to the accompanying drawings, forming part of this specification, in which similar letters of reference indicate corresponding parts in both the figures.

Figure 1:
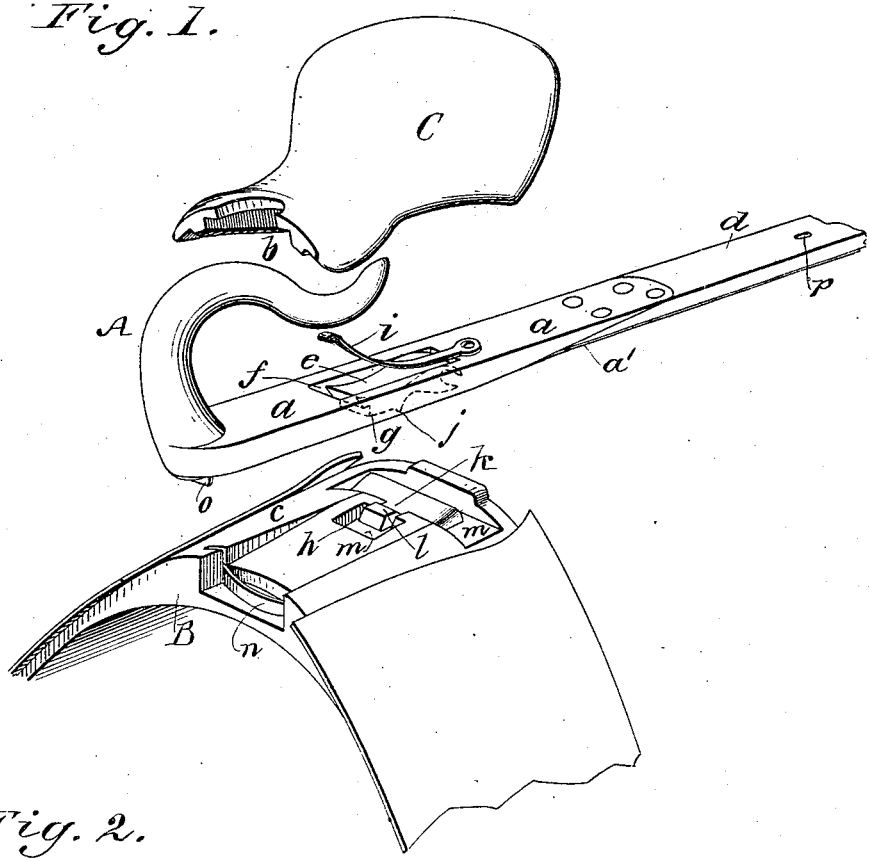
Figure 2:
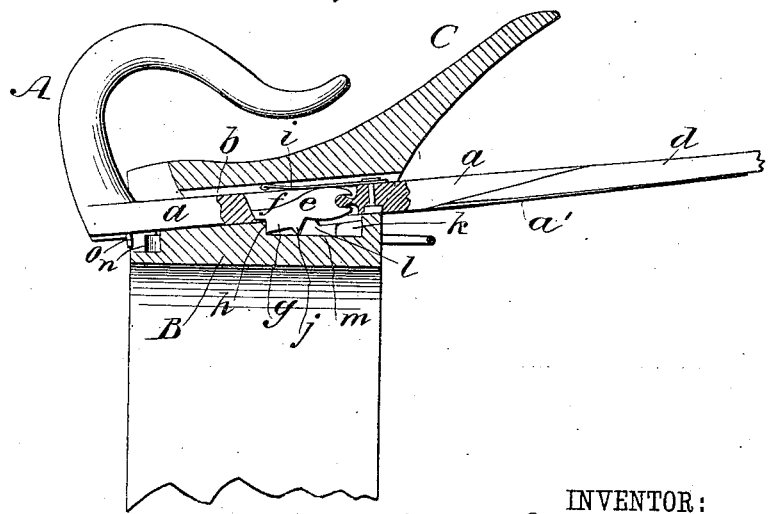

Figure 1 is a perspective view of a disassembled harness-tree hook and saddle of a harness made in accordance with my invention; and Fig. 2 is a sectional elevation of the same, showing the parts assembled and the check-hook locked in position for checking up the horse.

The check-hook A is secured to or made a part of the plate $a$, which in this instance is loosely held between the tree B and the saddle C, these parts being suitably recessed, as shown at $b$ $c$, for that purpose. The plate $a$ has the strap $d$ secured to its rear end, which strap may reach back to the carriage or to any point in reach of the driver, so that by drawing upon this strap the horse may be checked up or unchecked, as desired. When the check-hook A is drawn back into position for checking up the horse, (the position shown in Fig. 2,) it is locked in such position by the dog $e$, pivoted in the recess or passage $f$, made through the plate $a$, the lip $g$ of the dog engaging with the shoulder $h$, made in the tree B, as shown clearly in Fig. 2. The spring $i$ is provided to cause the dog $e$ to act with certainty, but this spring might be omitted, if desired.

For disengaging the the lip $g$ from the shoulder $h$, for permitting the hook A and plate $a$ to slide forward to slack the check-rein of the bridle and thus uncheck the horse, it is necessary to draw backward again upon the strap $d$, which will cause the beveled lip $j$ of the dog $e$ to ride upon the sliding plate or bridge-piece $k$, which will lift the dog so that the lip $g$ will stand on a higher level than the shoulder $h$. The bridge-piece $k$ is notched, as shown at $l$, and it is adapted to slide a short distance back and forth in the T-shaped recess $m$, made in the tree B. A curved spring, $n$, is placed at the forward edge of the tree B, and a lip, $o$, is formed or secured upon the lower edge of the hook A, so that as the hook A and plate $a$ are drawn backward for unchecking the horse the spring $n$ will be compressed, a considerable tension being put therein at the time lip $j$ passes over or into the notch $l$ of the bridge-piece $k$, so that when the strap $d$ is released the spring $n$ will force the hook A and plate $a$ forward. The spring $i$, when the dog $e$ rests upon the bridge-piece $k$, holds the dog pressed downward, so that the lip $j$ will engage with the notch $l$ with considerable force, so that when the spring $n$ forces the hook A and plate $a$ forward the bridge-plate $k$ will slide forward in the recess $m$ a short distance, and thus carry the lip $g$ over the shoulder $h$, thus practically releasing the check-hook from the saddle and tree, except as it is held by the strap $d$, which will always be of sufficient length to give the horse perfect freedom of the head. The forward edge of the lip $j$ is inclined or beveled, so as to readily slip off from the notch $l$. In checking up the horse by drawing backward upon the strap $d$, the lip $j$ of the dog coming against the forward end of the bridge-plate $k$ will slide the bridge-plate backward in the recess $m$ as far as it will go; so that the plate $k$ will not interfere with the engagement of the lip $g$ with the shoulder $h$ to again lock the hook in checked position. The spring $i$, besides serving to press the dog $e$ downward, also serves to prevent the check-rein of the bridle from leaving the check-hook A when the horse is unchecked, as will be understood from Fig. 1.

Instead of adapting the strap $d$ to reach back to the vehicle, it may be made short and provided with the hole $p$, or formed or provided with other means whereby a hook or knot in the driver's whip may be attached to the strap and the check-hook thus operated, and in most cases I shall stiffen the strap $d$ at the point of its attachment to the plate $a$ by the thin metal plate $a'$, to compel the plate $a$ always to properly re-enter the saddle-tree when the strap $d$ is drawn backward.

Having thus described my invention, what I claim as new, and desire to secure by Letters Patent, is—

1. The combination, with a saddle and its tree, of a hook provided with a bar sliding between the saddle and tree, and a dog for locking the bar in position, substantially as described.

2. The tree B and saddle C, recessed as shown at $b$ $c$, in combination with the sliding hook A and a locking-dog, arranged for the purposes set forth.

3. The combination, with the recessed tree B and saddle C, of the hook A, provided with the bar $a$, carrying the dog $e$, engaging a shoulder of the tree, substantially as herein shown and described.

4. The combination, with the hook A, provided with the plate $a$, having dog $e$, and the tree B, having shoulder $h$, of the sliding plate or bridge $k$, arranged to operate substantially as and for the purposes set forth.

5. The hook A, provided with the plate $a$, carrying the pivoted dog $e$, and formed with the projections $g$ $j$, in combination with the tree B, formed with shoulder $h$, and the sliding bridge or plate $k$, arranged to operate substantially as and for the purposes set forth.

6. The hook A, formed with the plate $a$, recessed at $f$, and provided with the dog $e$, in combination with the spring $i$ and recessed tree and saddle B C, substantially as described.

7. The hook A, formed with the plate $a$, recessed at $f$, and provided with the dog $e$ and spring $i$, in combination with the recessed tree B, provided with the shoulder $h$, sliding bridge $k$, and spring $n$, substantially as herein shown and described.

JOSEPH DARLING.

Witnesses:
A. W. WINFIELD,
LUTHER STONE.